US012770522B2

(12) United States Patent
Thappeta et al.

(10) Patent No.: US 12,770,522 B2
(45) Date of Patent: Oct. 20, 2026

(54) AIRBORNE DOCKING GUIDANCE SYSTEM AND METHOD

(71) Applicant: HONEYWELL INTERNATIONAL INC., Charlotte, NC (US)

(72) Inventors: Peddaiah Thappeta, Bangalore (IN); George Rajan Koilpillai, Bangalore (IN)

(73) Assignee: HONEYWELL AEROSPACE US LLC, Phoenix, AZ (US)

( * ) Notice: Subject to any disclaimer, the term of this patent is extended or adjusted under 35 U.S.C. 154(b) by 10 days.

(21) Appl. No.: 18/654,427

(22) Filed: May 3, 2024

(65) Prior Publication Data

US 2025/0273076 A1 Aug. 28, 2025

(30) Foreign Application Priority Data

Feb. 28, 2024 (IN) ............................ 202411014539

(51) Int. Cl.

| | |
|---|---|
| ***G08G 5/55*** | (2025.01) |
| ***B64D 45/00*** | (2006.01) |
| ***G08G 5/21*** | (2025.01) |
| ***G08G 5/26*** | (2025.01) |
| ***G08G 5/51*** | (2025.01) |

(52) U.S. Cl.

CPC ............... *G08G 5/55* (2025.01); *B64D 45/00* (2013.01); *G08G 5/21* (2025.01); *G08G 5/26* (2025.01); *G08G 5/51* (2025.01)

(58) Field of Classification Search

None

See application file for complete search history.

(56) References Cited

U.S. PATENT DOCUMENTS

| | | | | |
|---|---|---|---|---|
| 10,234,303 | B1 | 3/2019 | Chandrashekarappa et al. | |
| 11,053,023 | B2 | 7/2021 | Berkmo | |
| 2002/0030609 | A1 * | 3/2002 | Baumgartner .......... | B64F 1/002 340/945 |

(Continued)

FOREIGN PATENT DOCUMENTS

| | | | |
|---|---|---|---|
| EP | 3926608 | A2 | 12/2021 |
| EP | 4177864 | A1 | 5/2023 |

(Continued)

*Primary Examiner* — Amelia Vorce

(74) *Attorney, Agent, or Firm* — Ingrassia, Fisher & Lorenz LLP

(57) ABSTRACT

A system and method for providing airport docking guidance for an aircraft includes supplying, from an airport gate database, airport gate data parking data indicative of gate position points and a gate aircraft parking headings. Aircraft data is supplied from an aircraft data source. Position error data is supplied from a position error receiving system. Airport gate data for one airport gate is retrieved. A processing system processes the aircraft data and the position error data to determine, for the one airport gate, an aircraft position point, an aircraft position deviation, and an aircraft heading deviation. The position error data may be supplied from a ground-based position error transmission system that at least selectively determines, from airport gate data and a ground-based position measurement system, the position error data and transmits the position error data.

14 Claims, 9 Drawing Sheets

(56) References Cited

U.S. PATENT DOCUMENTS

| | | | | |
|---|---|---|---|---|
| 2003/0060998 | A1* | 3/2003 | Millgard | G08G 5/51 702/127 |
| 2015/0142218 | A1* | 5/2015 | Lin | G08G 5/51 701/3 |
| 2018/0301045 | A1* | 10/2018 | Pesik | B64F 1/002 |
| 2021/0390870 | A1 | 12/2021 | Subramaniyan et al. | |
| 2022/0246049 | A1* | 8/2022 | Håkansson | G08G 5/80 |

FOREIGN PATENT DOCUMENTS

| | | | | |
|---|---|---|---|---|
| LU | 100979 | B1 * | 3/2020 | B64F 1/002 |
| WO | 2020065093 | A1 | 4/2020 | |

* cited by examiner

AIRBORNE DOCKING GUIDANCE SYSTEM AND METHOD

CROSS REFERENCE TO RELATED APPLICATION

This application claims priority to India Provisional Patent Application No. 202411014539, filed Feb. 28, 2024, the entire content of which is incorporated by reference herein.

TECHNICAL FIELD

The present disclosure generally relates to docking guidance systems and, more particularly, to an airborne docking guidance system and method for aircraft.

BACKGROUND

Approaching and parking an aircraft at an airport gate is performed manually by the aircraft pilot and can, in some instances, be a challenging task. Thus, various solutions have been proposed to address the challenges associated with this task. One of the solutions that has been adopted at many airports is the Visual Docking Guidance System (VDGS). This system provides visual indications and direction cues to the pilot to help the pilot navigate the aircraft to, and stop at, the correct parking position at the assigned gate. A typical VDGS is disposed at, or near, each airport gate and includes various sensors and a relatively large display device. The sensors are used to detect the alignment of the aircraft and the display device is used to provide the visual indications and direction cues.

Although presently known VDGSs are generally safe and reliable, these systems do exhibit certain drawbacks. For example, during low visibility conditions at an airport, the visual indications and direction cues may not be sufficiently clear to a pilot, especially when the aircraft is at a significant distance from the gate and/or the aircraft heading is not aligned with the parking center line of the gate. Additionally, for airports that include numerous numbers of gates, the investment costs and maintenance cost can be relatively high. Moreover, if a VDGS becomes faulty, or otherwise inoperable, navigating to and parking at a gate can, as noted above, be challenging for a pilot.

Hence, there is a need for a system and method for providing docking guidance to an aircraft pilot that is not adversely impacted in low visibility conditions, does not have a per-gate cost, and provides increased reliability, thereby reducing the likelihood that a pilot may need to navigate to and parking at a gate with no assistance. The present disclosure addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, an airport docking guidance system for an aircraft includes an airport gate database, an aircraft data source, a position error receiving system, and a processing system. The airport gate database has airport gate data stored therein for a plurality of airport gates. The airport gate data includes, for each airport gate of the plurality of airport gates, parking data indicative of a gate position point and a gate aircraft parking heading. The aircraft data source is configured to supply aircraft data that includes data indicative of aircraft dimensions, sensed aircraft position, and sensed aircraft heading. The position error receiving system is configured to supply position error data that is indicative of a position error between the sensed aircraft position and actual aircraft position. The processing system is in operable communication with the airport gate database, the aircraft data source, and the position error receiving system. The processing system is configured to: retrieve airport gate data for one airport gate of the plurality of airport gates, receive the aircraft data supplied from the aircraft data source, receive the position error data from the position error receiving system, and process the aircraft data and the position error data to determine, for the one airport gate, an aircraft position point, an aircraft position deviation, and an aircraft heading deviation. The aircraft position point is a position offset from the gate position point and based on the aircraft dimensions. The aircraft position deviation is a deviation of the actual aircraft position from the gate position point. The aircraft heading deviation is an angular deviation between sensed aircraft heading and the gate aircraft parking heading.

In another embodiment, a method for providing airport docking guidance for an aircraft includes supplying, from an airport gate database, airport gate data for a plurality of airport gates, where the airport gate data includes, for each airport gate of the plurality of airport gates, parking data indicative of a gate position point and a gate aircraft parking heading. Aircraft data is supplied from an aircraft data source, where the aircraft data includes data indicative of aircraft dimensions, sensed aircraft position, and sensed aircraft heading. Position error data is supplied from a position error receiving system, where the position error data is indicative of a position error between the sensed aircraft position and actual aircraft position. Airport gate data for one airport gate of the plurality of airport gates is retrieved, using a processing system. The aircraft data supplied from the aircraft data source is received in the processing system, and the position error data supplied from the position error receiving system is received in the processing system. The processing system processes the aircraft data and the position error data to determine, for the one airport gate, an aircraft position point, an aircraft position deviation, and an aircraft heading deviation. The aircraft position point is a position offset from the gate position point and based on the aircraft dimensions. The aircraft position deviation is a deviation of the actual aircraft position from the gate position point. The aircraft heading deviation is an angular deviation between sensed aircraft heading and the gate aircraft parking heading.

In yet another embodiment, an airport docking guidance system includes a ground-based subsystem and an aircraft-based subsystem. The ground-based subsystem includes a ground-based airport gate database and a ground-based position error transmission system. The ground-based airport gate database has airport gate data stored therein for a plurality of airport gates, where the airport gate data includes, for each airport gate of the plurality of airport gates, parking data indicative of a gate position point and a gate aircraft parking heading. The ground-based position error transmission system is in operable communication with the ground-based airport gate database and is configured to at least selectively (i) determine, from the airport gate data and a ground-based position measurement system, position error data and (ii) transmit the position error data. The aircraft-based subsystem includes a display device, an airport gate database, an aircraft data source, a position error receiving system, and a processing system. The display device is responsive to display commands to render one or more images. The airport gate database has the airport gate data stored therein. The aircraft data source is configured to supply aircraft data that is indicative of aircraft dimensions, sensed aircraft position, and sensed aircraft heading. The position error receiving system is configured to receive and supply the position error data transmitted from the ground-based position error transmission system, where the position error data is indicative of a position error between the sensed aircraft position and actual aircraft position. The processing system is in operable communication with the airport gate database, the aircraft data source, and the position error receiving system. The processing system is configured to: retrieve airport gate data for one airport gate of the plurality of airport gates, receive the aircraft data supplied from the aircraft data source, receive the position error data from the position error receiving system, process the aircraft data and the position error data to determine, for the one airport gate, an aircraft position point, an aircraft position deviation, and an aircraft heading deviation, and command the display device to render an image representative of at least the determined aircraft position deviation and the determined aircraft heading deviation. The aircraft position point is a position offset from the gate position point and based on the aircraft dimensions, the aircraft position deviation is a deviation of the actual aircraft position from the gate position point, the aircraft heading deviation is an angular deviation between sensed aircraft heading and the gate aircraft parking heading.

Furthermore, other desirable features and characteristics of the airport docking guidance system and method will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
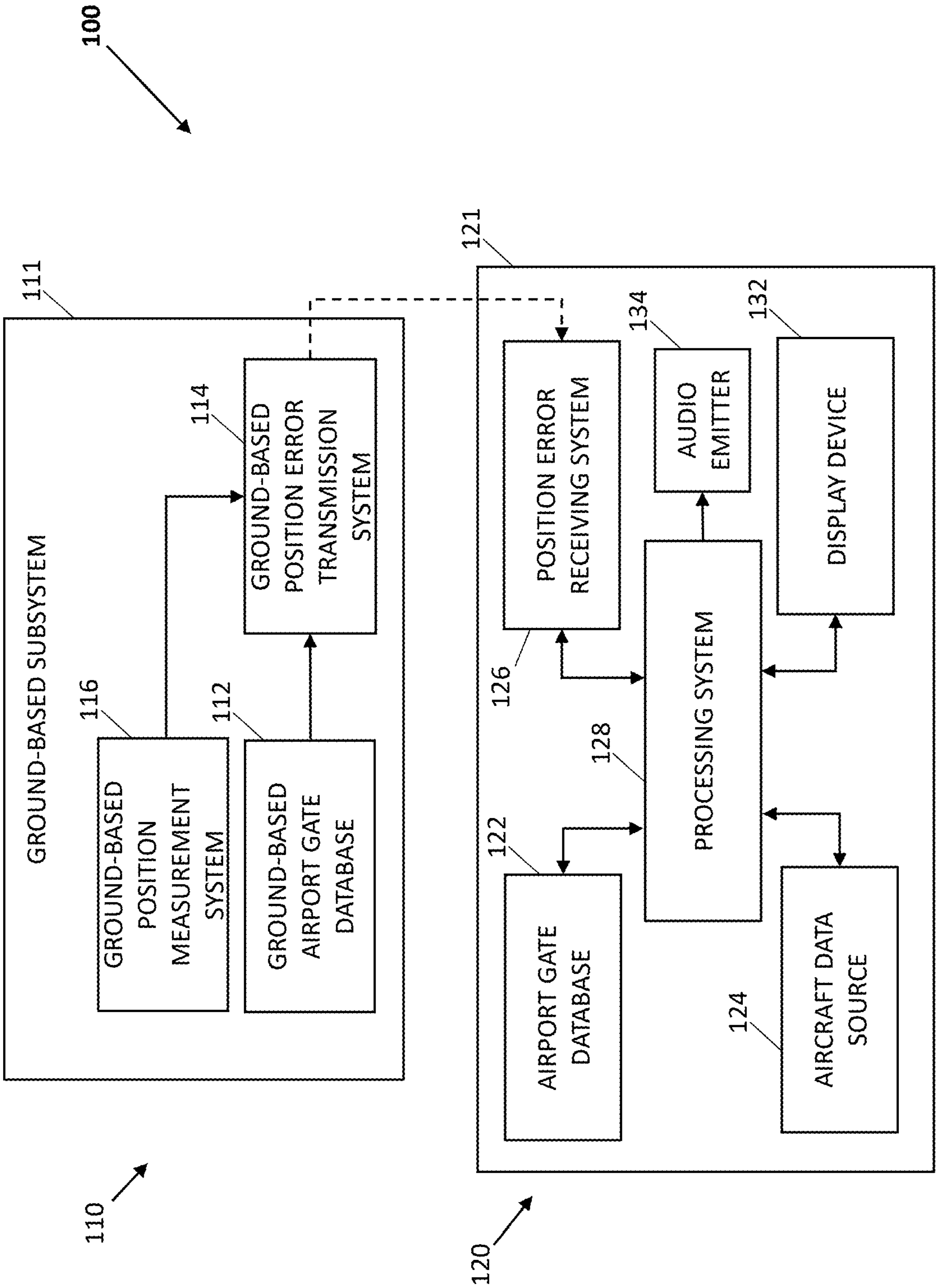
FIG. 1 depicts a functional block diagram of one embodiment of an airport docking guidance system.

Referring to FIG. 1, a functional schematic diagram of one embodiment of an airport docking guidance system 100 is depicted and includes a ground-based subsystem 110 and an aircraft-based subsystem 120. The ground-based subsystem 110, which is located at an airport 111, includes a ground-based airport gate database 112, a ground-based position error transmission system 114, and a ground-based position measurement system. It should be noted that the ground-based subsystem 110 could be implemented using single or multiple devices, systems, and/or subsystems, which could vary from airport-to-airport.

Figure 2:
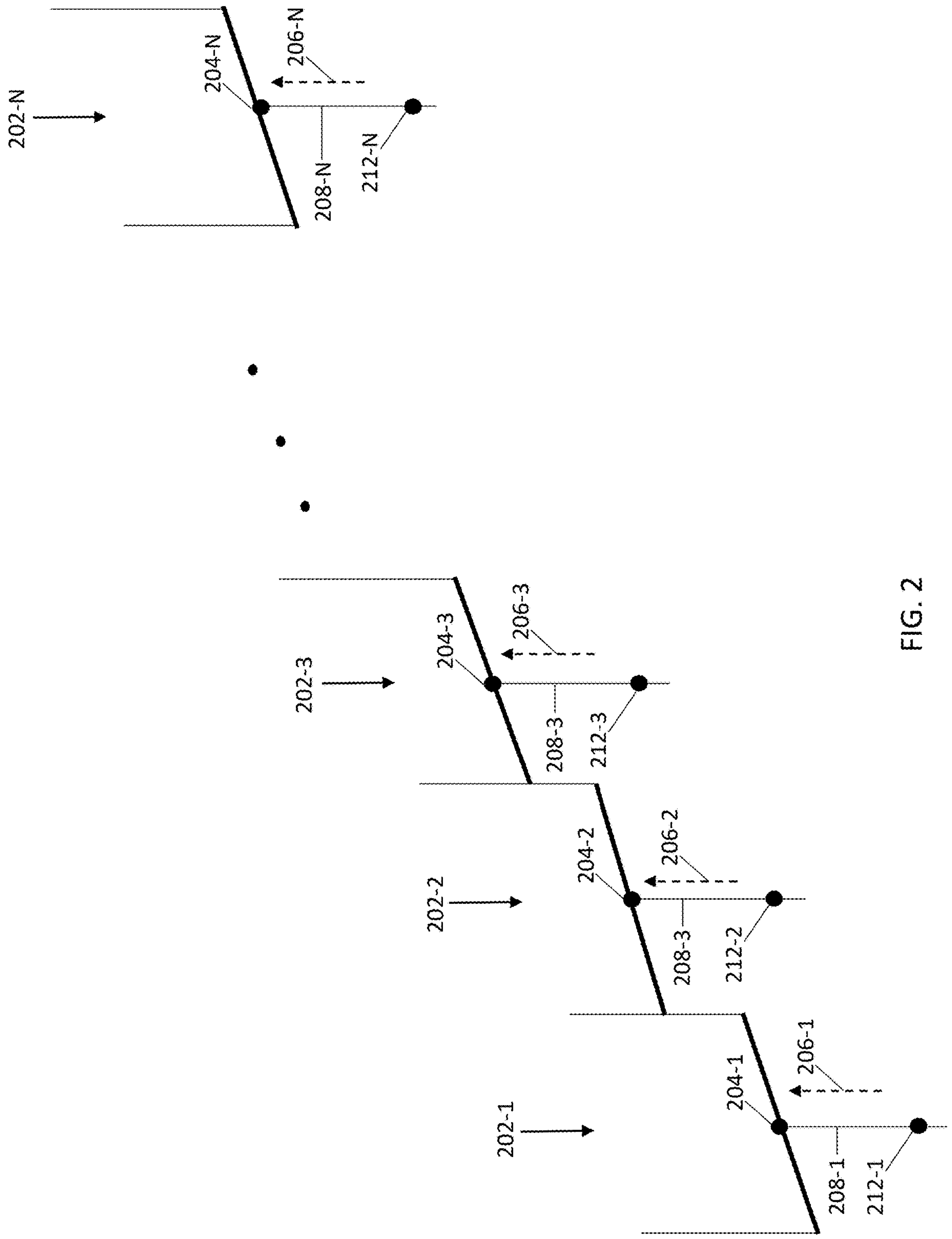
FIG. 2 schematically depicts an airport with a plurality of airport gates and various data associated therewith that is stored in a database.

The ground-based airport gate database 112 has airport gate data stored therein for a plurality of airport gates. Although the airport gate data may vary, and as FIG. 2 depicts more clearly, this data includes, for each airport gate 202 of the plurality of airport gates (e.g., 202-1, 202-2, 202-3 . . . 202-N), at least parking data indicative of a gate position point 204 and a gate aircraft parking heading 206. Each gate position point 204 is a physical, fixed location. Each gate position point 204 is a point at the edge of its associated parking gate 202 and is on the parking centerline 208, which extends from the gate 202. Preferably, the gate position points 204 and gate aircraft parking headings 206 are based upon the World Geodetic System 1984 (WGS84), which, as is generally known, defines an Earth-centered, Earth-fixed coordinate system.

Referring again to FIG. 1, the ground-based position error transmission system 114 is in operable communication with the ground-based airport gate database 112 and is configured to determine, from the airport gate data and a ground-based position measurement system 116, position error data associated with each gate 202. The ground-based position error transmission system 114 is additionally configured to transmit, preferably wirelessly, the determined position error data. The position error data is indicative of the position error between the actual gate position points 204, which are stored in the ground-based airport gate database 112, and the positions of the gate position points as sensed by the ground-based position measurement system 116. The ground-based position measurement system 116 may be implemented using, for example, a global positioning system (GPS), a Satellite Based Augmentation System (SBAS), or a GPS-denied navigation system, just to name a few. As may be appreciated, the position error data, when received by an aircraft 121, is also indicative of the position error between the sensed aircraft position (using GPS or other suitable system onboard the aircraft 121) and the actual aircraft position. It will additionally be appreciated that the ground-based position error transmission system 114 may transmit the determined position error using any one of numerous short-range wireless transmission technologies.

Turning now to the aircraft-based subsystem 120, this subsystem 120 is disposed in an aircraft 121 and includes an airport gate database 122, an aircraft data source 124, a position error receiving system 126, and a processing system 128. The airport gate database 122 is identical to the ground-based airport gate database 112 and thus has the same airport gate data stored therein. Specifically, for each airport gate 202 of the plurality of airport gates (e.g., 202-1, 202-2, 202-3 . . . 202-N), it includes at least parking data indicative of the gate position point 204 and the gate aircraft parking heading 206.

The aircraft data source 124 is configured to supply aircraft data. Although the specific aircraft data may vary, it includes at least data indicative of aircraft dimensions, sensed aircraft position, and sensed aircraft heading. The aircraft dimensions, which may be unique to the individual aircraft or to an aircraft class, may vary but will typically include, for example, aircraft length, aircraft wingspan, distance between the aircraft nose and the front and aft landing gear, and the offset distance from the aircraft position sensed by the on-board sensors to the landing gear, just to name a few.

The sensed aircraft position is the position sensed by the aircraft's position sensing system and corresponds to nose landing gear. More specifically, when the aircraft GPS is used, the position sensed by the GPS is the position of the GPS antenna, and when the aircraft inertial navigation system (INS) is used, the sensed position it senses is the aircraft CG (center-of-gravity). In both instances, however, the sensed position is used, along with lever arm corrections, to determine the position of interest. In the current embodiment, the aircraft position sensed by GPS or INS is used to determine the position of the nose landing gear (with the lever arm corrections).

The sensed aircraft heading is the heading of the aircraft sensed by the aircraft's onboard heading sensor system, such as an inertial measurement unit (IMU), an attitude and heading reference system (AHRS), or any one of numerous other systems that sense and supply aircraft heading. Although the aircraft data source 124 is depicted using a single functional block, it will be appreciated that this is done merely for ease of depiction. In some embodiments, the aircraft data source 124 may be implemented using multiple devices, systems, and/or subsystems.

The position error receiving system 126 is configured to receive and supply the position error data wirelessly transmitted from the ground-based position error transmission system 114. As noted above, the position error data, when used within the aircraft 121, is indicative of the position error between the sensed aircraft position and actual aircraft position.

The processing system 128 generally represents the hardware, circuitry, processing logic, and/or other components configured to facilitate communications and/or interaction between the elements of the aircraft-based subsystem 120 and perform additional processes, tasks and/or functions to support operation of the aircraft-based subsystem 120, as described in greater detail below. Depending on the embodiment, the processing system 128 may be implemented or realized with a general-purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the processing system 128 includes processing logic that may be configured to carry out the functions, techniques, and processing tasks associated with the operation of the aircraft-based subsystem 120 described in greater detail herein. Furthermore, the steps of a method or algorithm described in connection with the embodiments disclosed herein may be embodied directly in hardware, in firmware, in a software module executed by the processing system 128, or in any practical combination thereof. In accordance with one or more embodiments, the processing system 128 includes or otherwise accesses a data storage element, such as a memory (e.g., RAM memory, ROM memory, flash memory, registers, a hard disk, or the like) or another suitable non-transitory short or long term storage media capable of storing computer-executable programming instructions or other data for execution that, when read and executed by the processing system 128, cause the processing system 128 to execute and perform one or more of the processes, tasks, operations, and/or functions described herein.

With the above in mind, it is seen that the processing system 128 is in operable communication with the airport gate database 122, the aircraft data source 124, and the position error receiving system 126. The processing system 128 is configured to retrieve airport gate data for one airport gate of the plurality of airport gates 202. More specifically, the processing system 128 will retrieve airport gate data for the airport gate 202 to which the aircraft 121 has been assigned to park.

The processing system 128 is also configured to receive the aircraft data supplied by the aircraft data source 124, and the position error data supplied by the position error receiving system 126. The processing system 128 processes the aircraft data and the position error data to determine, for the assigned airport gate 202, an aircraft position point, an aircraft position deviation, and an aircraft heading deviation.

Figure 3:
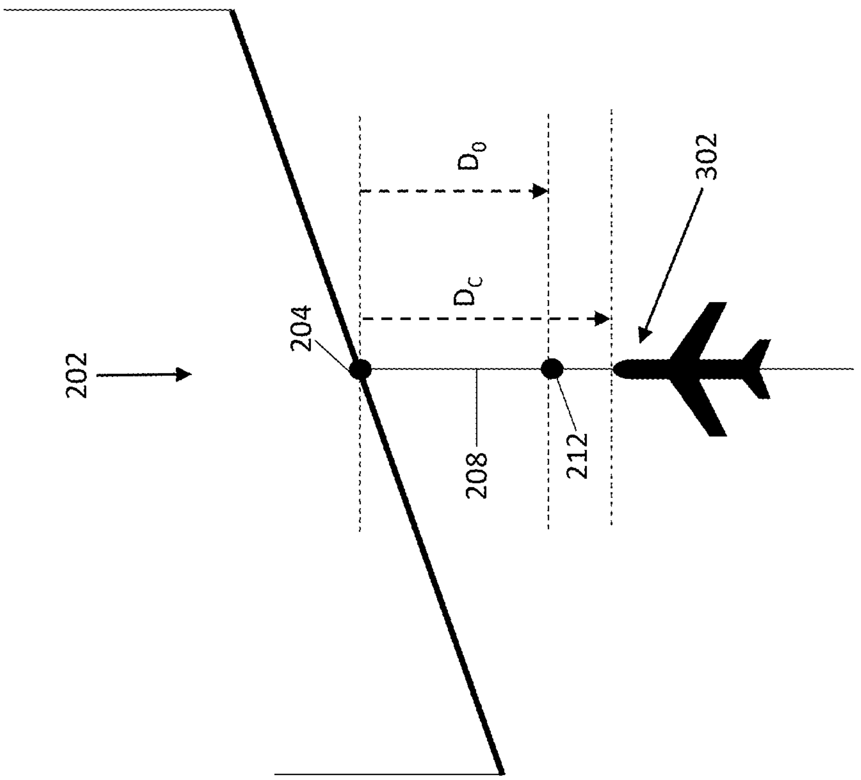
FIGS. 3-7 schematically depict an airport gate and an aircraft approaching the airport gate, together with various parameter determined by the system of FIG. 1.

As used herein, the aircraft position point is a position that is offset from the gate position point 204 and is based on the aircraft dimensions. More specifically, and with reference once again to FIG. 3, the gate position point 204 for each gate 202 is at a first position on the parking centerline 208 and, as previously noted, is a physical, fixed location. The aircraft position point 212 is at a second position on the parking centerline 208. The second position is, of course, based on the aircraft dimensions and may thus vary for different aircraft types. Thus, as shown in FIG. 3, the processing system 128 is additionally configured to determine the distance (Do) between the first position (i.e., the gate position point 204 for the assigned gate 202) and the second position (i.e., the aircraft position point 212). This distance is referred to herein as the parking position offset distance (Do), and may be determined by the processing system 128 via calculation or from data retrieved from the stored in the aircraft data source 124.

Figure 4:
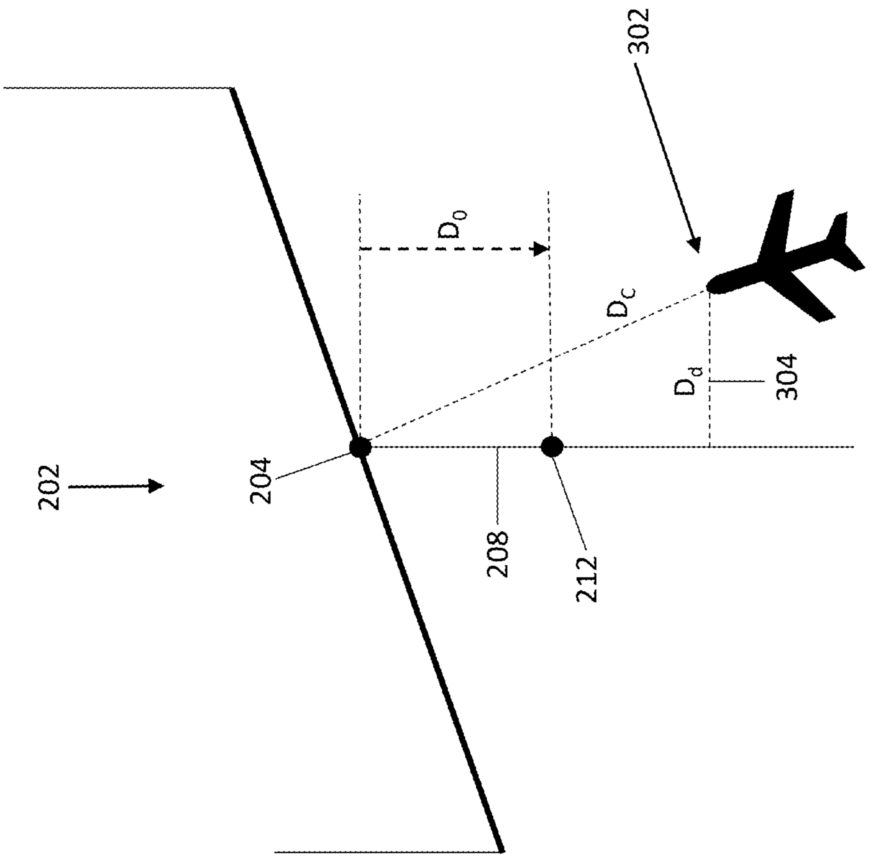
Figure 5:
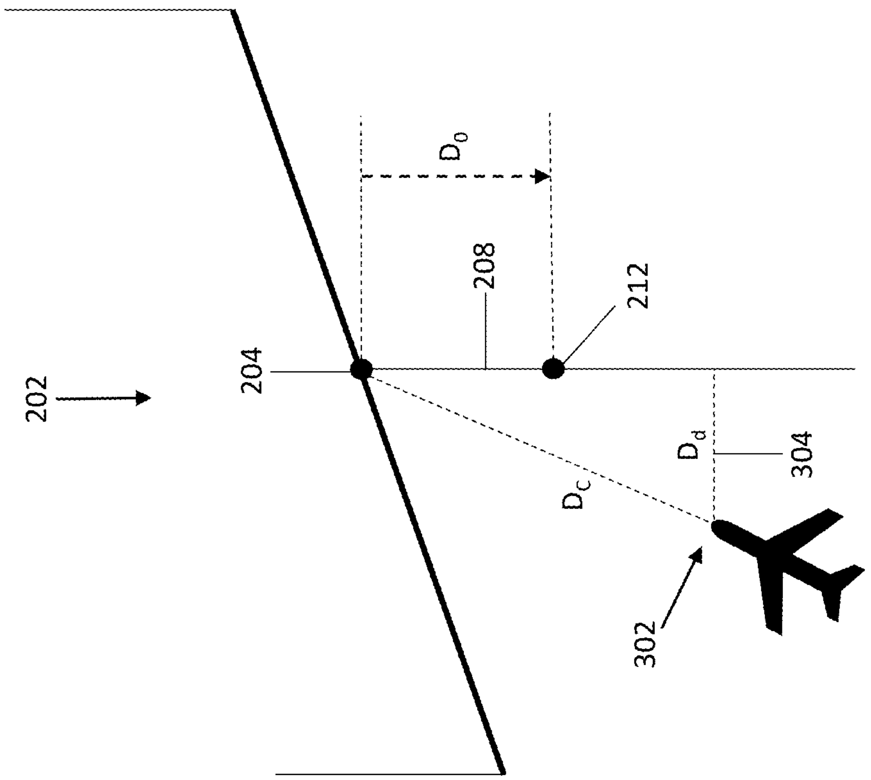

The aircraft position deviation, as used herein, is the deviation of the actual aircraft position from the gate position point 204. The aircraft position deviation includes both an actual aircraft offset distance ($D_c$) and an actual aircraft offset deviation distance ($D_d$). As used herein, and as FIGS. 3-5 depict, the actual aircraft offset distance ($D_c$) is the straight-line distance between the first position (i.e., the gate position point 204 for the assigned gate 202) and the actual aircraft position 302. The actual aircraft offset deviation distance (Dd) is the lateral distance from the parking centerline 208 for the assigned gate 202 to the actual aircraft position 302, along a line 304 that extends perpendicular to the parking centerline 208.

Figure 6:
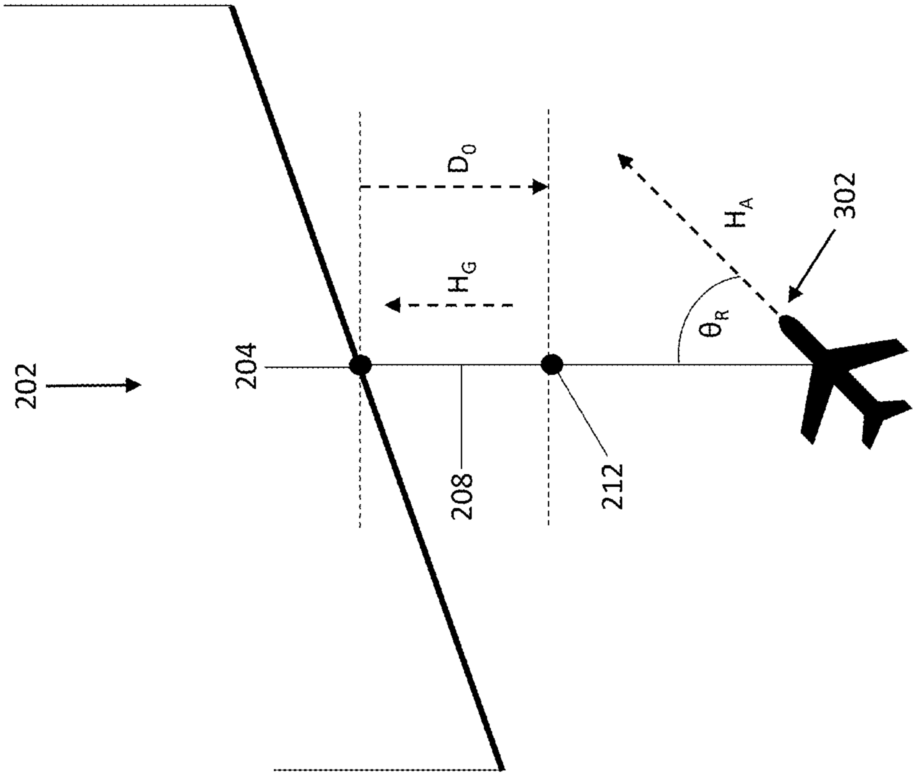
Figure 7:
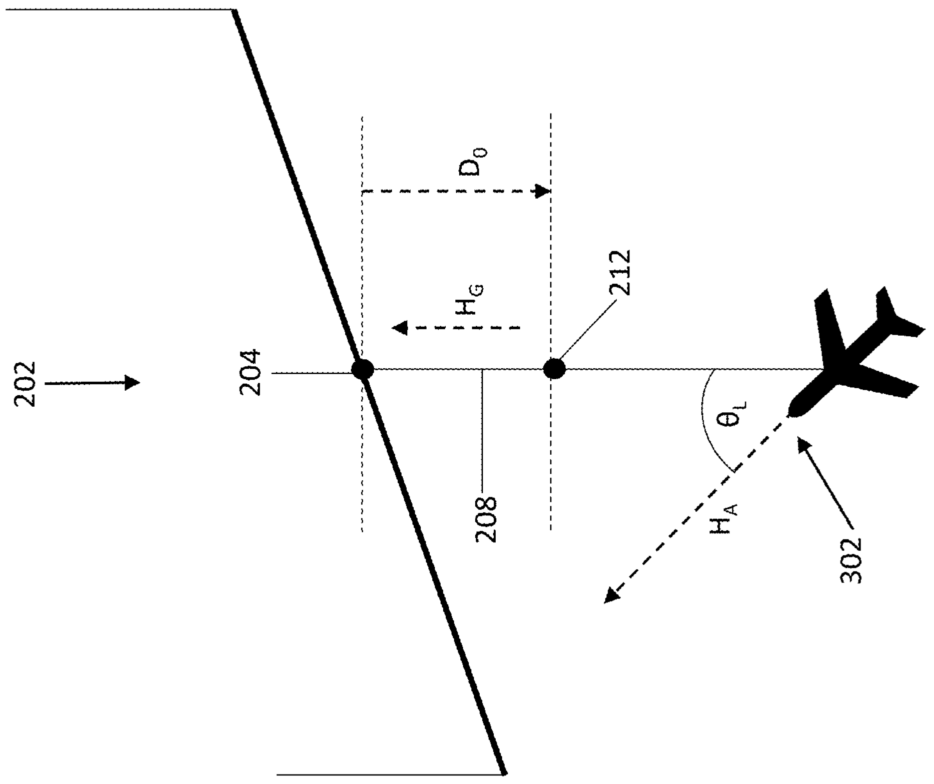

The aircraft heading deviation, as used herein, is the angular deviation between the sensed aircraft heading ($H_A$) and the gate aircraft parking heading 206 (labeled as $H_G$ in FIGS. 6 & 7), both of which are directions with respect to Earth true north. As shown more clearly in FIGS. 6 and 7, the aircraft heading deviation may be an angular deviation ($\theta_R$) to the right of the parking centerline 208 or an angular deviation ($\theta_L$) to the left of the parking centerline 208. In either case, the processing system 128 is configured to compute the angular deviation ($\theta_R$, $\theta_L$) by taking the difference between the gate aircraft parking heading ($H_G$) and the sensed aircraft heading ($H_A$); that is, $\theta_R/\theta_L=H_G-H_A$.

Figure 8:
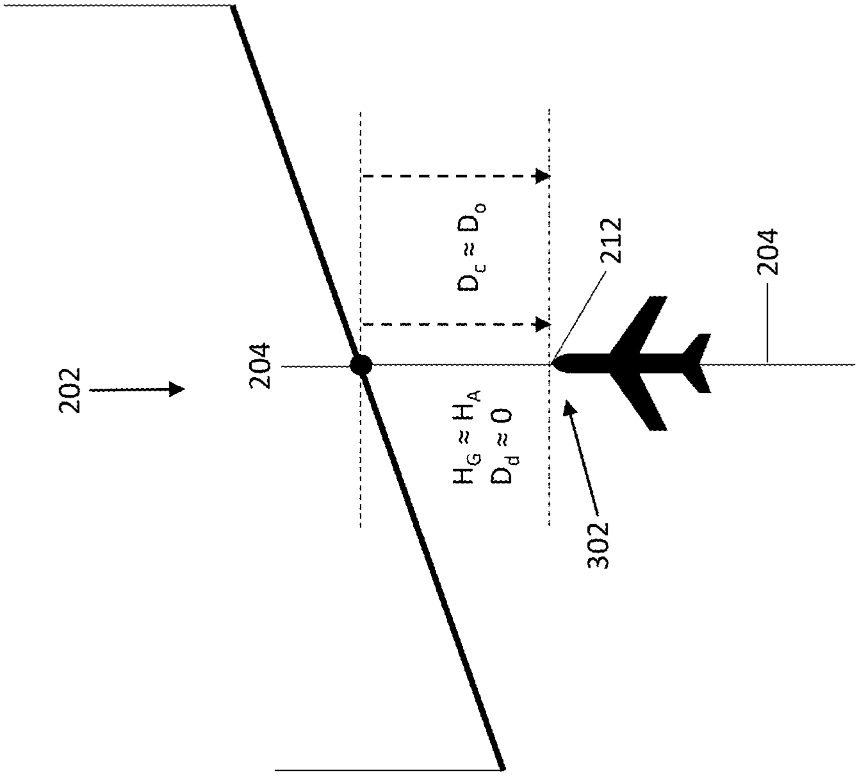
FIG. 8 schematically depicts an aircraft positioned to be properly parked at an airport gate.

As may be appreciated, the processing system 128 is additionally configured to determine when the aircraft is positioned to be properly parked at the assigned airport gate 202. In particular, the processing system 128 determines that the aircraft is properly positioned to be parked at the assigned airport gate 202 when the aircraft position deviation is substantially equal to zero and the aircraft heading deviation is substantially equal to zero. This is shown in FIG. 8, which illustrates that the aircraft is properly parked at the assigned airport gate 202 when: $D_c \approx D_o$ (e.g., within 1 meter), $D_d \approx 0$ (e.g., within 4 meters), and $H_G \approx H_A$ (e.g., within 0.3 degrees). It will be appreciated that the noted tolerances (e.g., ±1 meter, ±4 meters, ±0.3 degrees) are merely exemplary and that the tolerances (and thus what defines "substantially") may be more or less than these example values and may also vary depending on system accuracies, airport locations, airport and parking gate sizes, aircraft sizes, etc.

Returning once again to FIG. 1, it is seen that the aircraft-based subsystem 120 may additionally include a display device 132. The display device 132, when included, is in operable communication with the processing system 128 and is responsive to display commands to render one or more images. It will be appreciated that the display device 132 can include any number and type of image generating devices on which one or more images may be rendered. In various embodiments, the display device 132 may be affixed to the static structure of the aircraft cockpit such as, for example, a Head Down Display (HDD) or Head Up Display (HUD) unit. Alternatively, the display device 132 may assume the form of a movable display device (e.g., a pilot-worn display device) or a portable display device, such as an Electronic Flight Bag (EFB), a laptop, or a tablet computer carried into the aircraft cockpit by a pilot.

Regardless of the display device 132 is specifically implemented, the display commands, which are supplied from the processing system 128, cause the display device 132 to render images representative of at least the determined aircraft position deviation and the determined aircraft heading deviation. The determined aircraft position deviation and the determined aircraft heading deviation may be rendered graphically, textually, or both, as depicted, for example, in FIGS. 3-8.

The processing system 128 may additionally be configured to supply display commands to the display device 132 that will cause the display device 132 to render guidance messages. For example, the guidance messages may inform the pilot to navigate left, right, or straight depending on the aircraft position and heading deviations. In some embodiments, the processing system 128 may also be configured to supply display commands to the display device 132 that cause the display device 132 to render one or more warning messages. For example, if the aircraft position deviation, the aircraft heading deviation, or both exceed a preset threshold, the processing system 128 may command the display device 132 to render one or more warning messages.

In some embodiments, it may be desirable to also (or instead) supply aural warnings when the aircraft position deviation, the aircraft heading deviation, or both exceed the preset threshold. In such embodiments, the aircraft-based subsystem 120 may additionally include an audio emitter 134. The audio emitter 134, when included, is in operable communication with the processing system 128 and is responsive to alert commands, supplied from the processing system 128, to emit one or more audible warnings.

Figure 9:
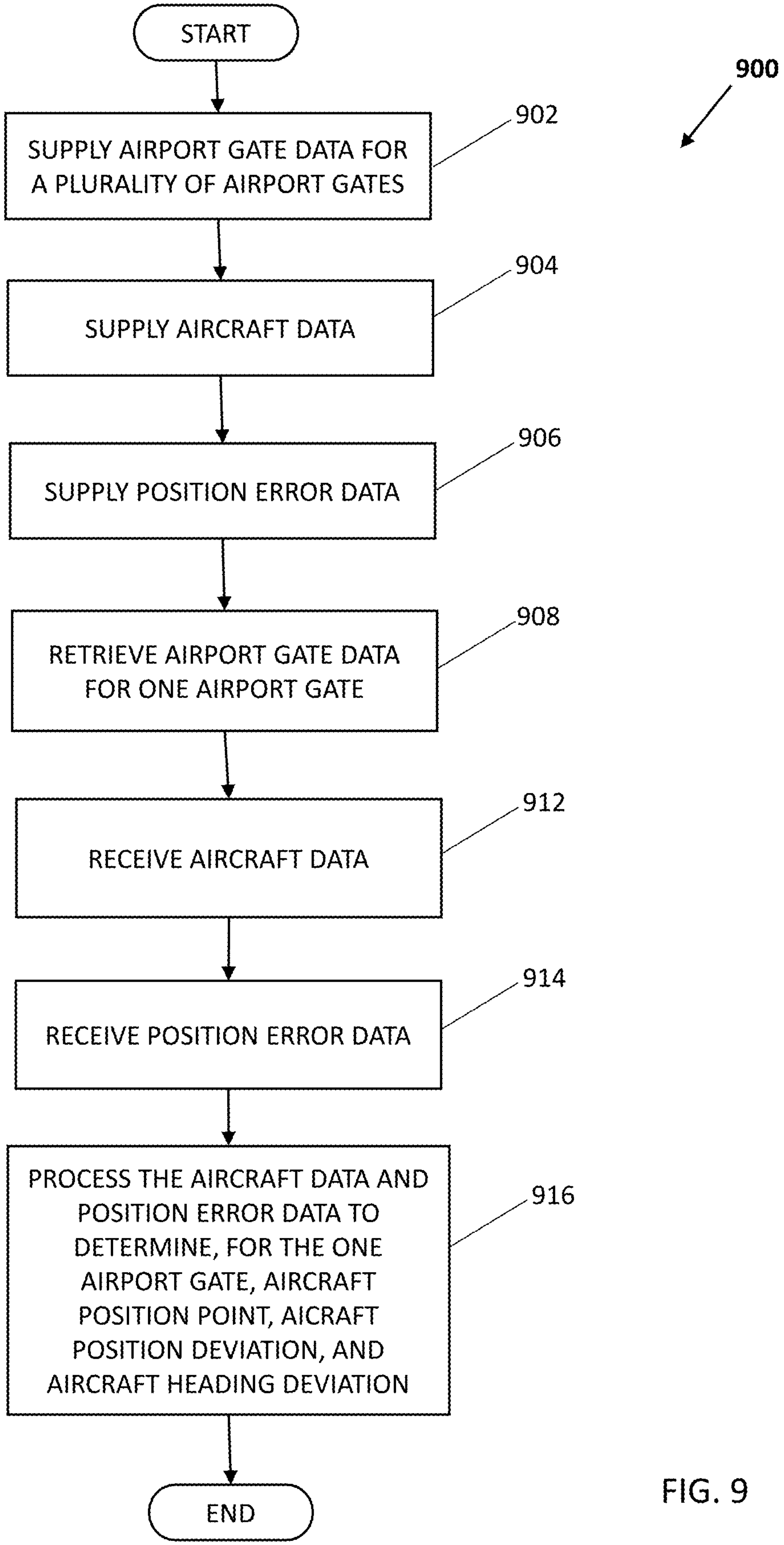
FIG. 9 depicts a process, in flowchart form, that may be implemented in the system of FIG. 1.

Having described the overall functionality of the system 100, a description of a method for providing airport docking guidance for an aircraft will now be described. The method 900, which is depicted in flowchart form in FIG. 9, represents various embodiments of a method for method for providing airport docking guidance for an aircraft. For illustrative purposes, the following description of method 900 may refer to elements mentioned above in connection with FIG. 1. In practice, portions of method 900 may be performed by different components of the described system 100. It should be appreciated that method 900 may include any number of additional or alternative tasks, the tasks shown in FIG. 9 need not be performed in the illustrated order, and method 900 may be incorporated into a more comprehensive procedure or method having additional functionality not described in detail herein. Moreover, one or more of the tasks shown in FIG. 9 could be omitted from an embodiment of the method 900 if the intended overall functionality remains intact.

The method 900 starts by supplying, from the airport gate database 122, airport gate data for a plurality of airport gates 202 (902), supplying aircraft data from the aircraft data source 124 (904), and supplying the position error data from the position error receiving system 126 (906). The processing system 128 retrieves airport gate data for one airport gate of the plurality of airport gates (908), receives the aircraft data supplied from the aircraft data source (912), and receives the position error data from the position error receiving system (914). The processing system 128 then processes the aircraft data and the position error data to determine, for the one airport gate, the aircraft position point, the aircraft position deviation, and the aircraft heading deviation (916). As may be appreciated, the aircraft position deviation and aircraft heading deviation may be displayed on the display device 132.

It should be noted that the processing system 128 is configured, in most embodiments, to use the Earth-centered, Earth-fixed coordinate system and the equations and algorithms to compute the lateral deviation computations, and to use standard mathematics, such as geometric, algebraic equations or algorithms for various other computations, such as heading deviation computations.

The docking guidance system and method described herein is not adversely impacted in low visibility conditions, does not have a per-gate cost, and provides increased reliability, thereby reducing the likelihood that a pilot may need to navigate to and parking at a gate with no assistance.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An airport docking guidance system for an aircraft, the system comprising:

an airport gate database on the aircraft and having airport gate data stored therein for a plurality of airport gates, the airport gate data including, for each airport gate of the plurality of airport gates, parking data indicative of a gate position point and a gate aircraft parking heading;

an aircraft data source on the aircraft and configured to supply aircraft data, the aircraft data including data indicative of aircraft dimensions, sensed aircraft position, and sensed aircraft heading;

a position error receiving system on the aircraft and configured to supply position error data, the position error data indicative of a position error between the sensed aircraft position and actual aircraft position;

a display device on the aircraft and responsive to display commands to render one or more images; and a circuit on the aircraft and forming a processing system with a processor, the processing system in operable communication with the display device, the airport gate database, the aircraft data source, and the position error receiving system, the processing system configured to:

retrieve airport gate data for one airport gate of the plurality of airport gates, receive the aircraft data supplied from the aircraft data source, receive the position error data from the position error receiving system, process the aircraft data and the position error data to determine, for the one airport gate, an aircraft position point, an aircraft position deviation, and an aircraft heading deviation, the aircraft position point being a position offset from the gate position point and based on the aircraft dimensions, wherein the gate position point is a first position on a parking centerline that extends from the gate position point though the aircraft position point, wherein the aircraft position point is a second position on the parking centerline, wherein the processing system is arranged to determine a parking position offset distance, the parking position offset distance being a distance between the first position and the second position, wherein the aircraft position deviation comprises an actual aircraft offset distance and an actual aircraft offset deviation distance, the actual aircraft offset distance being a distance between the first position and the actual aircraft position, and the actual aircraft offset deviation distance being a lateral distance from the parking centerline to the actual aircraft position along a line that extends perpendicular to the parking centerline, the aircraft heading deviation being an angular deviation between the sensed aircraft heading and the gate aircraft parking heading, wherein the processing system being further arranged to determine that the aircraft is properly positioned to park at the one airport gate when the actual aircraft offset distance is substantially equal to the parking position offset distance, the actual aircraft offset deviation distance is substantially equal to zero, and the aircraft heading deviation is substantially equal to zero; and supply display commands to the display device that cause the display device to (i) automatically render direction cues on the aircraft including a graphical image showing at least the parking centerline with the gate position point and the aircraft position point relative to the actual aircraft position and the sensed aircraft heading of the aircraft so that the graphical image is representative of at least the determined aircraft position deviation and the determined aircraft heading deviation and (ii) automatically render guidance messages coupled with the graphical image that inform a pilot of the aircraft to navigate left, right, or straight depending on the aircraft position and heading deviations while the pilot is navigating the aircraft to the gate.

2. The system of claim 1, wherein the processing system is further configured to selectively supply display commands to the display device that cause the display device to render one or more warning messages.

3. The system of claim 2, further comprising:

an audio emitter in in operable communication with the processing system, the audio emitter responsive to alert commands to emit one or more audible warnings, wherein the processing system is further configured to selectively supply the alert commands to the audio emitter.

4. The system of claim 1, further comprising:

a ground-based position error transmission system configured to at least selectively determine and transmit the position error data to the position error receiving system.

5. The system of claim 4, further comprising:

a ground-based airport gate database in operable communication with the ground-based position error transmission system, wherein the ground-based airport gate database has the airport gate data stored therein, and the ground-based position error transmission system is further configured to determine, from the airport gate data and a ground-based position measurement system, the position error data.

6. The system of claim 4, further comprising:

storing, in a ground-based airport gate database, the airport gate data;

determining, in the ground-based position error transmission system, the position error data from the airport gate data in the ground-based gate database and from a ground-based position measurement system; and at least selectively transmitting, using the ground-based position error transmission system, the position error data.

7. The system of claim 1, wherein the display device is an electronic flight bag (EFB) on the aircraft during aircraft navigation to a gate.

8. The system of claim 1, comprising sensing, by a ground-based position measurement system, the position of the gate position point by using a global positioning system (GPS), a satellite based augmentation system (SBAS), or a GPS-denied navigation system.

9. A method for providing airport docking guidance for an aircraft, the method comprising the steps of:

supplying, from an airport gate database on the aircraft, airport gate data for a plurality of airport gates, the airport gate data including, for each airport gate of the plurality of airport gates, parking data indicative of a gate position point and a gate aircraft parking heading;

supplying aircraft data from an aircraft data source on the aircraft, the aircraft data including data indicative of aircraft dimensions, sensed aircraft position, and sensed aircraft heading;

supplying position error data from a position error receiving system on the aircraft, the position error data indicative of a position error between the sensed aircraft position and actual aircraft position;

retrieving, using a processing system with a circuit forming a processor on the aircraft, airport gate data for one airport gate of the plurality of airport gates;

receiving, in the processing system, the aircraft data supplied from the aircraft data source;

receiving, by the processing system, the position error data from the position error receiving system;

processing, by the processing system, the aircraft data and the position error data to determine, for the one airport gate, an aircraft position point, an aircraft position deviation, and an aircraft heading deviation, the aircraft position point being a position offset from the gate position point and based on the aircraft dimensions, wherein the gate position point is a first position on a parking centerline that extends from the gate position point though the aircraft position point, wherein the aircraft position point is a second position on the parking centerline, wherein the processing system is arranged to determine a parking position offset distance, the parking position offset distance being a distance between the first position and the second position, wherein the aircraft position deviation comprises an actual aircraft offset distance and an actual aircraft offset deviation distance, the actual aircraft offset distance being a distance between the first position and the actual aircraft position, and the actual aircraft offset deviation distance being a lateral distance from the parking centerline to the actual aircraft position along a line that extends perpendicular to the parking centerline, the aircraft heading deviation being an angular deviation between sensed aircraft heading and the gate aircraft parking heading, wherein the processing system being further arranged to determine that the aircraft is properly positioned to park at the one airport gate when the actual aircraft offset distance is substantially equal to the parking position offset distance, the actual aircraft offset deviation distance is substantially equal to zero, and the aircraft heading deviation is substantially equal to zero; and commanding, using the processing system, a display device on the aircraft to (i) automatically render direction cues on the aircraft including a graphical image showing at least the parking centerline with the gate position point and the aircraft position point relative to the actual aircraft position and the sensed aircraft heading of the aircraft so that the graphical image is representative of at least the determined aircraft position deviation and the determined aircraft heading deviation and (ii) automatically render guidance messages coupled with the graphical image that inform a pilot of the aircraft to navigate left, right, or straight depending on the aircraft position and heading deviations while the pilot is navigating the aircraft to the gate.

10. The method of claim 9, further comprising:

commanding, using the processing system, the display device to render one or more warning messages.

11. The method of claim 9, further comprising:

commanding, using the processing system, an audio emitter to emit one or more audible warnings.

12. The method of claim 9, wherein the display device is an electronic flight bag (EFB) on the aircraft during aircraft navigation to a gate.

13. The method of claim 9, comprising determining the sensed aircraft position by using a GPS and a GPS antenna position, or an inertial navigation system (INS) and a center of gravity (COG) of the aircraft, to determine a nose landing gear position.

14. An airport docking guidance system, the system comprising:

a ground-based subsystem and an aircraft-based subsystem, wherein the ground-based subsystem comprises:

a ground-based airport gate database having airport gate data stored therein for a plurality of airport gates, the airport gate data including, for each airport gate of the plurality of airport gates, parking data indicative of a gate position point and a gate aircraft parking heading, and a ground-based position error transmission system in operable communication with the ground-based airport gate database, the ground-based position error transmission system configured to at least selectively (i) determine, from the airport gate data and a ground-based position measurement system, position error data and (ii) transmit the position error data;

and wherein the aircraft-based subsystem comprises:

a display device on the aircraft and responsive to display commands to render one or more images, an airport gate database on the aircraft and having the airport gate data stored therein, an aircraft data source on the aircraft and configured to supply aircraft data, the aircraft data including data indicative of aircraft dimensions, sensed aircraft position, and sensed aircraft heading, a position error receiving system on the aircraft and configured to receive and supply the position error data transmitted from the ground-based position error transmission system, the position error data indicative of a position error between the sensed aircraft position and actual aircraft position, and a circuit on the aircraft and forming a processing system with a processor, the processing system in operable communication with the airport gate database, the aircraft data source, and the position error receiving system, the processing system configured to:

retrieve airport gate data for one airport gate of the plurality of airport gates, receive the aircraft data supplied from the aircraft data source, receive the position error data from the position error receiving system, process the aircraft data and the position error data to determine, for the one airport gate, an aircraft position point, an aircraft position deviation, and an aircraft heading deviation, the aircraft position point being a position offset from the gate position point and based on the aircraft dimensions, wherein the gate position point is a first position on a parking centerline that extends from the gate position point though the aircraft position point, wherein the aircraft position point is a second position on the parking centerline, wherein the processing system is arranged to determine a parking position offset distance, the parking position offset distance being a distance between the first position and the second position, wherein the aircraft position deviation comprises an actual aircraft offset distance and an actual aircraft offset deviation distance, the actual aircraft offset distance being a distance between the first position and the actual aircraft position, and the actual aircraft offset deviation distance being a lateral distance from the parking centerline to the actual aircraft position along a line that extends perpendicular to the parking centerline, the aircraft heading deviation being an angular deviation between sensed aircraft heading and the gate aircraft parking heading, wherein the processing system being further arranged to determine that the aircraft is properly positioned to park at the one airport gate when the actual aircraft offset distance is substantially equal to the parking position offset distance, the actual aircraft offset deviation distance is substantially equal to zero, and the aircraft heading deviation is substantially equal to zero, and command the display device to (i) automatically render direction cues on the aircraft including a graphical image showing at least the parking centerline with the gate position point and the aircraft position point relative to the actual aircraft position and the sensed aircraft heading of the aircraft so that the graphical image is representative of at least the determined aircraft position deviation and the determined aircraft heading deviation and (ii) automatically render guidance messages coupled with the graphical image that inform a pilot of the aircraft to navigate left, right, or straight depending on the aircraft position and heading deviations while the pilot is navigating the aircraft to the gate.

* * * * *